May 20, 1924.
E. DEISTER
VEHICLE WHEEL.
Filed April 18, 1922
1,494,592
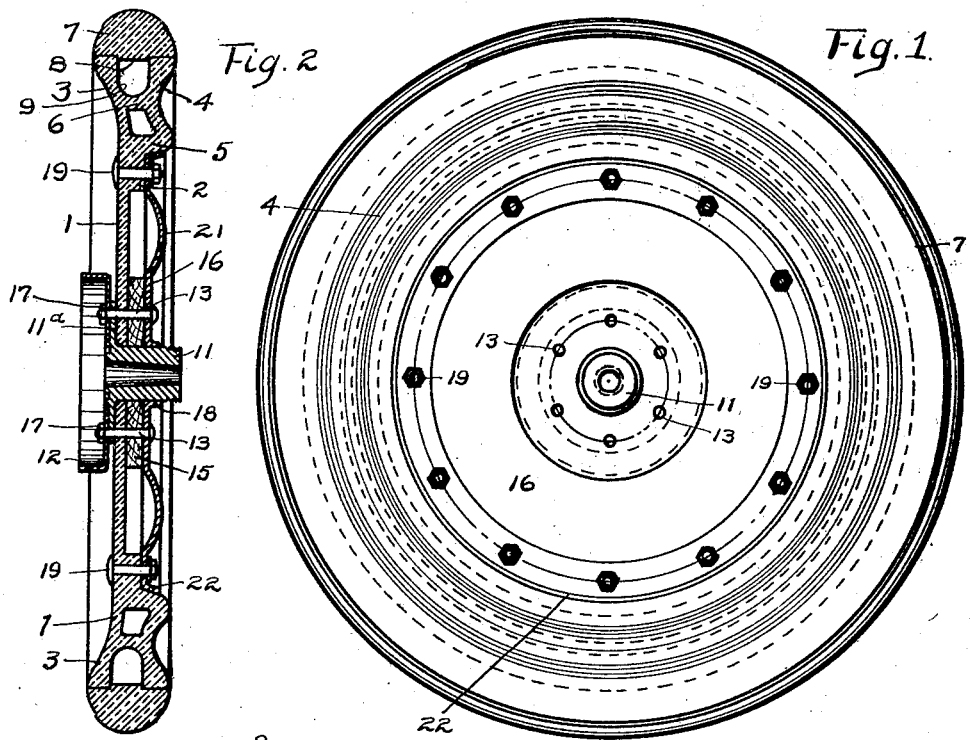
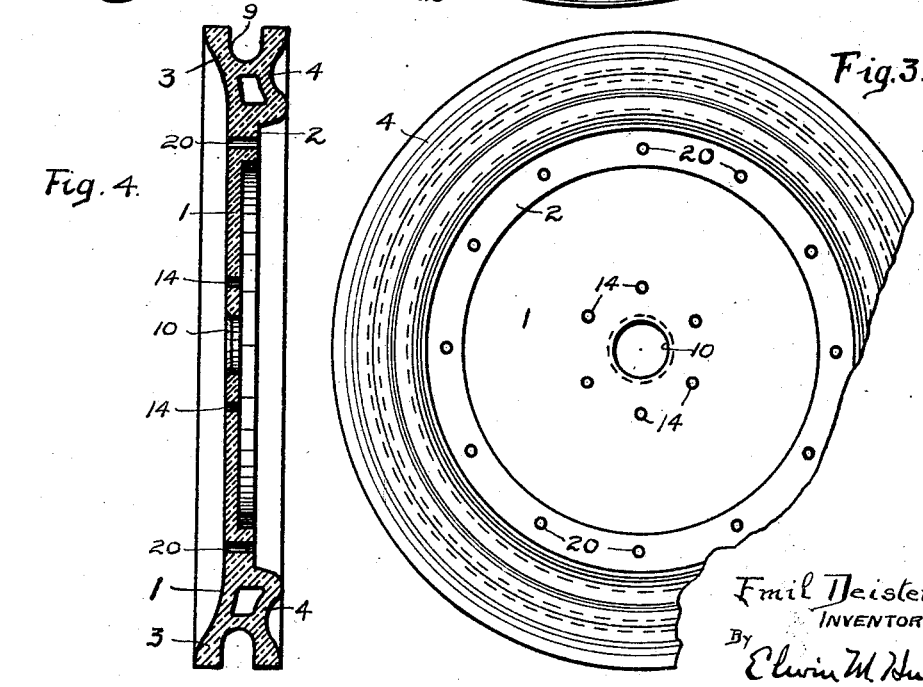
Emil Deister
INVENTOR
By Elwin M. Hulse
ATTORNEY Patented May 20, 1924.

1,494,592

UNITED STATES PATENT OFFICE.

EMIL DEISTER, OF FORT WAYNE, INDIANA.

VEHICLE WHEEL.

Application filed April 18, 1922. Serial No. 555,209.

*To all whom it may concern:*

Be it known that I, EMIL DEISTER, a citizen of the United States, residing at Fort Wayne, in the county of Allen and State of Indiana, have invented new and useful Improvements in Vehicle Wheels, of which the following is a specification.

The invention relates to vehicle wheels and particularly to resilient wheels for motor vehicles.

The object of the invention is to provide a durable wheel wherein the commonly used pneumatic tire is eliminated and which, in operation, shall be most resilient and efficient and shall absorb all shocks and jars incident to the travel of the wheel.

The invention is an improvement on the wheel described in my pending application Serial No. 464,489, filed April 25, 1921, and consists in a wheel having a resilient rim divided circumferentially so as to form an annular shock absorbing space in the periphery of the rim and means to support the rim on the hub of the wheel, the said means being either non-resilient or resilient or a combination of both. In the present adaptation of the invention illustrated in the accompanying drawings, I make use of an annual resilient disk and a non-resilient disk, the latter disk being rigidly secured to the hub of the wheel and clamped to the resilient disk, the divided rim being formed by two laterally spaced flanges, one of which is formed by the outer portion of the resilient disk and the other of which is secured to the disk and is spaced therefrom.

In the accompanying drawings, Figure 1 is an elevational view of a wheel embodying the invention; Fig. 2 is a vertical cross-sectional view of the same; Fig. 3 an elevational view of the resilient disk and rim and Fig. 4 a vertical cross-sectional view of the same.

Referring to the drawings, 1 is an annular disk formed of rubber or rubber and fabric vulcanized in suitable manner. It is somewhat dish-shaped or curved laterally adjacent to its periphery and a thickened portion 2 is provided adjacent to the curved portion, the outer extremity of the latter portion forming a flange 3 of the rim of the wheel. An annularly concaved or inwardly curved member or flange 4, formed of the same material as the disk, is connected by the annular base or web 5 and the annular web 6 to the annular disk, the web 6 being preferred to provide reinforcement for the flanges 3 and 4 as hereinafter more fully set forth. The outer portion of the disk 1 with its flange 3 thus form with the flange 4 a circumferentially divided rim for the wheel and also a seat for a tread or tire 7 preferably formed of soft, tough rubber suitably secured thereto as by vulcanization. A shallow rib 8 is preferably formed on the inner surface of the tire so as to center the tire and hold it in place prior to and during the vulcanizing operation. In practice, the flange 4 will be formed separately, or formed with the webs 5 and 6 thereon, and then vulcanized to the disk in order to form the annular space between the webs and the annular shock absorbing space 9 between the flanges 3 and 4 and hence in the periphery of the rim. I have found the space or channel 9 to be most desirable and advantageous, as will appear hereinafter.

An aperture 10 is formed in the center of the disk 1 to receive the hub 11 of any form commonly in use, the hub forming no part of my invention. In the present illustration the hub is provided with a flange 11$^a$ to which the brake drum 12 is generally attached. The flange has formed therein a suitable number of apertures adapted to receive the bolts 13, which bolts also pass through similar apertures formed in the brake drum, in the disk 1 indicated at 14, in the spacing ring 15 which surrounds the hub and in the annular non-resilient member or disk 16. By tightening the nuts 17 on the bolts 13 the said apertured parts are clamped firmly and rigidly to the flange 11$^a$ of the hub.

The annular disk 16 is formed of suitable non-resilient material, such as steel, aluminum or other suitable metal. Its central portion is apertured for insertion over the hub, and a flange or sleeve 18 about the aperture projects laterally from the disk to form a reinforcement for the disk 16. Adjacent to the periphery of the disk 16 are formed apertures to receive the bolts 19 which extend through the apertures 20 formed in the disk, preferably in the thickened portion 2 thereof. The disk 16 is curved outwardly or dished between the points of its attachment to the disk 1, the concaved face of the dished portion 21 facing the disk 1. The periphery of the member or disk 16 is bent outwardly to form an inclined annular flange 22 which bears and clamps against the inner inclined circular wall or base of the flange 4. Hence the disk 16 forms an annular sloping seat which firmly engages the inner wall of the rim, and as it is rigidly clamped to the disk 1 it reinforces and stiffens the entire wheel and prevents its collapse and causes the wheel to run true or in alinement. The disk, where all bolts are passed through it, is preferably vulcanized to a greater degree of hardness than elsewhere in order that the bolts may be tightened rigidly without pulling through the disk.

In operation, the tire constantly bulges into the annular space or channel 9 and tends to spread out laterally under the weight of the vehicle and under the influence of shocks and jars incident to the travel of the wheel. This lateral spreading of the tire causes lateral spreading of the flanges 3 and 4 of the divided rim which to large extent absorbs the jars and shocks. As the members or flanges of the rim tend to spread apart they also tend to approach each other at the web 6 due to the curvature of the flanges, that of one being opposite to that of the other, thus giving an additional cushioning effect to the wheel and completing the substantial absorption of all jars and shocks incident to the travel of the wheel.

What I claim is:

1. In a vehicle wheel, an annular resilient disk and an annular member connected to the disk and cooperating with the peripheral portion of the disk to form a rim, the said member being spaced from said portion to form a shock absorbing space between them and in the periphery of the rim.

2. In a vehicle wheel, an annular resilient disk, an annular member cooperating with the peripheral portion of the disk to form a rim, and an annular web spacing the said member from the said portion and reinforcing the same.

3. In a vehicle wheel, an annular resilient disk, an annular resilient member cooperating with the peripheral portion of the disk to form a rim, and a reinforcing annular web spacing the said member from the disk and being less in diameter than the periphery of the rim, to form an annular shock absorbing space in the rim periphery.

4. A vehicle wheel comprising an annular resilient disk, a rim having two members the peripheral portion of the disk forming one member of the rim and a resilient flange on the disk spaced therefrom and forming the other member of the rim, the spacing of the two members being such that an annular shock-absorbing space is formed between them and in the periphery of the rim, and non-resilient means to support the disk and rim.

5. A vehicle wheel comprising an annular non-resilient disk and a resilient rim secured to the disk and consisting of two resilient annular flanges spaced apart to form an annular shock-absorbing space between them and in the periphery of the rim.

6. A vehicle wheel comprising an annular non-resilient disk and a resilient rim secured to the disk and consisting of two oppositely curved resilient flanges spaced apart to form an annular shock-absorbing space between them and in the periphery of the rim.

7. A vehicle wheel comprising an annular non-resilient disk, a resilient rim secured to the disk and consisting of two annular resilient flanges and an annular web spacing the two flanges to form an annular shock absorbing space between the said flanges and in the periphery of the rim.

8. A vehicle wheel comprising an annular non-resilient disk, a resilient rim secured to the disk and consisting of two resilient oppositely curved annular flanges and an annular web spacing the two flanges laterally to form an annular shock absorbing space between said flanges and in the periphery of the rim.

9. A vehicle wheel comprising a resilient disk, a resilient rim on the disk consisting of two laterally spaced annular flanges having between them and in the periphery of the rim an annular shock-absorbing space, and non-resilient means engaging the disk and the rim for supporting the same.

10. A vehicle wheel comprising a disk formed of vulcanized material, a resilient flange vulcanized to the disk and spaced from the peripheral portion thereof and forming with said portion a resilient rim, the spacing of said flange and said peripheral portion of the disk being such that an annular shock-absorbing space is formed in the periphery of the rim.

11. A vehicle wheel comprising a disk formed of vulcanized material, a resilient flange vulcanized to the disk and spaced from the peripheral portion thereof and forming with said portion a resilient rim, the spacing between the said flange and said peripheral portion of the disk being such that an annular shock-absorbing space is formed between said members and in the periphery of the rim and a non-resilient disk clamped to the vulcanized disk and forming a support for the flange.

12. A vehicle wheel comprising a hub, a resilient annular disk clamped to the hub, a circumferentially split resilient rim on the disk having a shock absorbing space in its periphery and non resilient means secured to the hub and rigidly clamped to the disk for supporting the disk and rim on the hub, and a tire secured to the rim.

In witness whereof I have hereunto subscribed my name this 17th day of April, 1922.

EMIL DEISTER.